Figure 1:
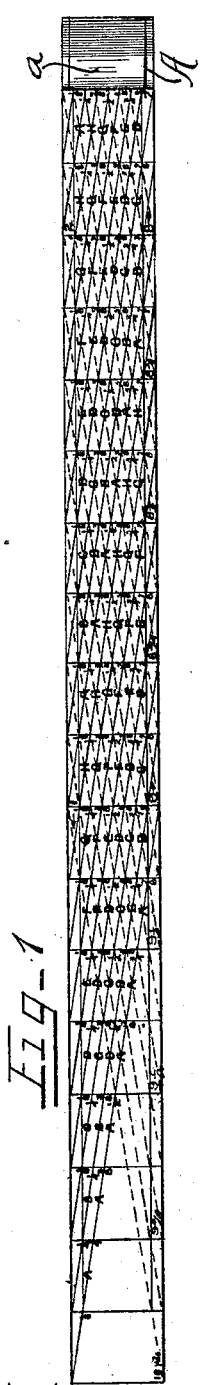

No. 795,741. PATENTED JULY 25, 1905.
D. B. STRICKLAND.
MEASURING AND PROTECTING MEANS FOR FABRICS.
APPLICATION FILED AUG. 20, 1904.

Witnesses
J. W. Angell
W. W. Withenbury

Inventor
Daniel B. Strickland.
by Charles W. Rice Atty

UNITED STATES PATENT OFFICE.

DANIEL B. STRICKLAND, OF RIVER FOREST, ILLINOIS.

MEASURING AND PROTECTING MEANS FOR FABRICS.

No. 795,741.      Specification of Letters Patent.      Patented July 25, 1905.

Application filed August 20, 1904. Serial No. 221,457.

*To all whom it may concern:*

Be it known that I, DANIEL B. STRICKLAND, a citizen of the United States, and a resident of River Forest, Cook county, Illinois, have invented certain new and useful Improvements in Measuring and Protecting Means for Fabrics; and I do hereby declare that the following is a full, clear, and exact description of the same, reference being had to the accompanying drawings, and to the letters of reference marked thereon, which form a part of this specification.

This invention relates to measuring and protecting means for fabrics, and more particularly to a strip adapted to be rolled or folded in the roll or bolt of fabric for the purpose of protecting the fabric from soiling and also enabling the salesman to measure therefrom the desired purchase and to accurately ascertain the quantity remaining unsold.

Heretofore fabrics such as ribbons have usually been put up for sale in a roll or bolt in which a strip of paper of approximately the same or of slightly-greater width is rolled with the ribbon. From this bolt the ribbon is sold as required. In making sales large quantities of ribbon are frequently exposed, and considerable portions of each roll are unwound, displayed, and a little sold. The greater part, however, is rewound and returned to the shelves and inspected. When a purchase is made, no matter if from a partial or from an entire bolt, the first sale made makes it impossible thereafter to determine accurately the amount of ribbon remaining in the bolt. In consequence as successive shoppers examine the goods it becomes necessary to measure the amount remaining many times. During the measuring the protecting-paper is usually separated from the ribbon or fabric, which soon becomes soiled and damaged from the handling. After a short time, though no further sales be made from the bolt, it is necessary to reduce the price to enable the same to be sold, thus entailing great loss.

The object of this invention is to provide a measuring and protecting strip which may be constructed of paper, thin cloth, or any suitable material adapted, if used with fabric such as ribbon, to be wound therewith into the roll and with certain other fabrics to be folded with the same into the bolt and enabling the salesman to cut therefrom the exact amount of the purchase and to determine instantly by inspection of the end of the strip the amount still remaining unsold.

It is also an object of the invention to afford means whereby one employed to inspect sales can readily determine the amount of the sale from examination of the portion of the strip which accompanies the fabric purchased.

The invention consists in the matters hereinafter described, and more fully pointed out and defined in the appended claims.

Figure 2:
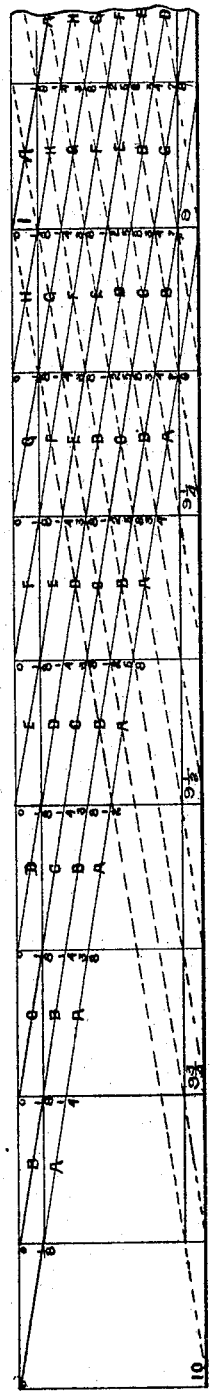
Figure 3:
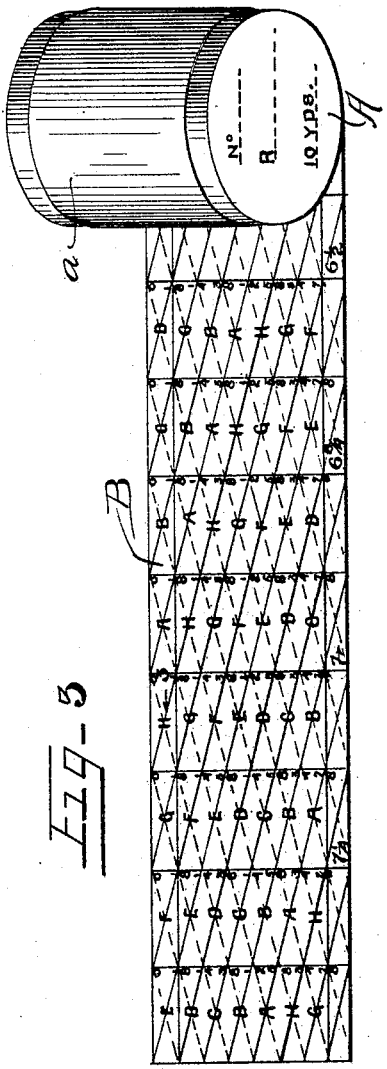

As shown in the drawings, Figure 1 is a plan view of a bolt of ribbon having a portion of the strip unfolded and exposed for view. Fig. 2 is an enlarged fragmentary detail of the strip. Fig. 3 is an enlarged view of the roll with a portion of the measuring-strip exposed, showing the same after sales have been made.

As shown in said drawings, A indicates as a whole the roll or bolt of ribbon or other fabric in which the ribbon or fabric is wound into a roll with a measuring-strip B of the same length and constructed of paper, cloth, or other suitable material. As shown, the width of the fabric is slightly less than the strip, though obviously the width is not material. Said measuring-strip is graduated with a linear scale on opposite margins and from opposite ends, one margin, as shown, having units of measurements thereon and the other units and fractions thereof, as yards, halves, quarters, and eighths, or lower denominations, and, if preferred, with the metric scale, so that the scales at opposite margins of the strip read oppositely, one indicating the exact amount of goods remaining in the bolt, while the other is used by the salesman to measure the purchase from the bolt. As shown, said strip is ruled, marked, or creased transversely at each of the divisions and fractional denominations, and from one margin of the sheet at each of the transversal rulings a diagonal line is drawn to the opposite margin to the transverse ruling at the unit of distance or one yard therefrom. Said diagonal lines beginning at the extremity of the strip are each marked between the transverse lines in their order by a distinctive character—for example, the first eight letters of the alphabet should the denomination "yards" be used and by the first ten letters of the alphabet if the metric system should be used. If preferred, diagonal lines may be in a like manner drawn from the opposite end of the strip and also may be marked distinctively in any suitable manner, if desired, and are herein indicated as dotted lines and the characters omitted to avoid confusion.

The operation is as follows: When it is desired to cut a portion from the bolt or roll, the ribbon or fabric, with the strip, is unwound therefrom in sufficient quantity, and if, as indicated in Fig. 2, the diagonal line A terminates at the extremity of the strip the the opposite end of said line will indicate one yard. If more than one yard is required, it is only necessary to look across the strip to the line corresponding with the letter and tracing thereon the number of spaces between the transverse lines required and cut therefrom the quarter, half, or whatever fraction may be required. In this manner whatever the number of yards or fractions required the measurement is all done on the line or lines A or that extending to the end of the strips, thereby, in effect, making the end of the strip wherever cut the begining of another unit, and by following the diagonal line commencing thereon any further amount may be measured without computing fractions. By inspection the clerk can immediately see the amount of the purchase and the number of yards remaining in the bolt. In the same manner should the line E or any other terminate at the extremity of the strip the measurements if performed upon said diagonal line for the respective purchase must of necessity be accurate, and the amount cut off and the amount remaining in the bolt can be known at a glance either by the inspection of the end of the strip remaining in the bolt or the portion of the strip cut off, which is passed to an inspector with the purchase. The strip is wound with the purchase, also affording a measure for the purchaser.

I have shown but one of several methods of embodying my invention, and therefore do not purpose limiting myself otherwise than necessitated by the prior art and stated in the claims, as obviously many details of construction and arrangement may be varied without departing from the principles of my invention.

I claim as my invention—

1. A measuring-strip for the purpose specified having on its margins oppositely-reading linear scales and marked transversely to indicate the units and fractions of the unit of measurement and diagonal lines each indicated by a distinctive letter and extending a unit of measurement longitudinally of the strip and terminating at opposite margins of the strip.

2. A measuring-strip having linear scales marked on its margins and reading from opposite ends thereof, transverse lines extending across the strip and marking the units, and fractional units of measurement, diagonal lines connecting the opposite extremities of transverse lines, which are a unit distance apart and distinctively marked by characters, corresponding in number with the fractional divisions of the unit.

3. A measuring-strip for the purpose specified having indicated on its margins and reading from opposite ends of the strip linear scales in yards and fractions of a yard, lines extending across at the points indicated on the scales and indicating fractional divisions of a yard, diagonal lines indicated by as many consecutive characters as there are fractional divisions used, and each commencing at the margin of the strip on one of said transverse lines and extending to the opposite margin at the transverse line, a yard therefrom and oppositely-arranged diagonal lines similarly arranged adapted to read from the other end of the strip.

4. A fabric rolled or folded with a measuring-strip, comprising a strip of material of equal length with the fabric and marked with linear scales on opposite margins and reading from opposite ends, lines extending across the strip and indicating the units and fractional units of measurements and diagonal lines also extending across the strip and terminating on said transverse lines one yard apart at the margins and marked by distinctive characters and each marked at each transverse line indicating the fractional units of a yard.

In testimony whereof I have hereunto subscribed my name in the presence of two subscribing witnesses.

DANIEL B. STRICKLAND

Witnesses:
  HJALMAR S. RUDD,
  W. W. WITHENBURY.